United States Patent

Mohamed et al.

[11] Patent Number: 5,978,838
[45] Date of Patent: Nov. 2, 1999

[54] COORDINATION AND SYNCHRONIZATION OF AN ASYMMETRIC, SINGLE-CHIP, DUAL MULTIPROCESSOR

[75] Inventors: Moataz A. Mohamed, Santa Clara; Heonchul Park, Cupertino; Le Trong Nguyen, Monte Sereno, all of Calif.

[73] Assignee: Samsung Electronics Co., Ltd., Seoul, Rep. of Korea

[21] Appl. No.: 08/703,434

[22] Filed: Aug. 26, 1996

Related U.S. Application Data

[63] Continuation-in-part of application No. 08/699,597, Aug. 19, 1996.

[51] Int. Cl.$^6$ .................................................. G06F 15/16

[52] U.S. Cl. .......................................................... 709/208

[58] Field of Search ....................... 395/200.38; 209/208

[56] References Cited

U.S. PATENT DOCUMENTS

| | | | |
|---|---|---|---|
| 4,916,657 | 4/1990 | Morton . | |
| 5,146,592 | 9/1992 | Pfeiffer et al. | 345/344 |
| 5,218,211 | 6/1993 | Yoshida | 395/800.34 |
| 5,327,541 | 7/1994 | Reinecke et al. | 395/800.02 |
| 5,361,385 | 11/1994 | Bakalash | 345/424 |
| 5,495,588 | 2/1996 | Gibart et al. | 395/379 |
| 5,513,366 | 4/1996 | Agarwal et al. . | |
| 5,515,520 | 5/1996 | Hatta et al. . | |
| 5,530,888 | 6/1996 | Amasaki et al. | 395/825 |
| 5,590,328 | 12/1996 | Seno et al. | 395/675 |
| 5,689,653 | 11/1997 | Karp et al. . | |
| 5,706,478 | 1/1998 | Dye | 345/503 |
| 5,706,514 | 1/1998 | Bonola | 395/674 |

OTHER PUBLICATIONS

Brantly, et al., "Double Speed, Single Precision Vector Register Organization Using Double Port Chips", IBM Technical Disclosure Bulletin, vol. 23, No. 9, pp. 4357–4360 (Feb., 1981).

*Primary Examiner*—William M. Treat
*Attorney, Agent, or Firm*—Skjerven, Morrill, MacPherson, Franklin & Friel LLP; David T. Millers

[57] ABSTRACT

An integrated multiprocessor architecture simplifies synchronization of multiple processing units. The multiple processing units constitute a general-purpose or control processor and a vector processor which has a single-instruction-multiple-data (SIMD) architecture so that multiple parallel processing units in the vector processor all complete an instruction simultaneously and do not require software synchronization. The control control processor controls the vector processor and creates a fork in a program flow by starting the vector processor. An instruction set for the control processor includes special instructions that enable the control processor to access registers of the vector processor, start or halt execution by the vector processor, and test flags written by the vector processor to indicate completion of tasks. The two processors then execute separate program threads in parallel until the control processor stops the vector processor, an exception is encountered, or the vector processor completes its program thread and enters an idle state. An instruction set for the vector processor includes special instructions that interrupt the first processor to indicate a task is complete. A register coupled to and accessible by both processors stores a state bit indicating whether the vector processor is running or idle. The control processor can synchronize the separate program threads by executing a loop which polls the state bit. When the state bit indicates the vector processor is idle, the general-purpose processor can process results from the vector processor and restart the vector processor.

15 Claims, 5 Drawing Sheets

COORDINATION AND SYNCHRONIZATION OF AN ASYMMETRIC, SINGLE-CHIP, DUAL MULTIPROCESSOR

CROSS-REFERENCE TO RELATED APPLICATION

This is a Continuation-In-Part of application Ser. No. 08/699,597, entitled "SINGLE-INSTRUCTION-MULTIPLE-DATA PROCESSING IN A MULTIMEDIA SIGNAL PROCESSOR", filed Aug. 19, 1996.

BACKGROUND OF THE INVENTION

1. Field of the Invention

This invention relates to multiprocessors and particularly to systems and methods for coordinating or synchronizing parallel execution of separate program threads.

2. Description of Related Art

Multiprocessors are known to include multiple processors that cooperate to accomplish a task. A relatively simple multiprocessor system includes a co-processor (such as a 80386 processor) and a floating point processor (such as a 80387 math co-processor). In such systems, when the processor encounters an instruction which requires a floating point operation, the processor activates the co-processor which executes the instruction. Math co-processors such as the 80387 are limited to executing a single instruction when directed and are idle between floating point instructions. The increase in processing power provided by such co-processors is correspondingly limited.

Another multiprocessor architecture contains two or more identical processors which execute separate but coordinated program threads. Keeping program threads coordinated or synchronized, for example, to pass results between program threads can be difficult because the time required to complete a section of a program thread varies. For example, cache hits and misses and instruction dependencies can delay execution pipelines and change the number of cycles required to complete instructions. Accordingly, instruction sequences in different program threads often get out of synchronization with each other.

To maintain proper synchronization, hardware connected between the processors can delay or idle processors as required to synchronize one program thread with another. In some systems having multiple identical processors, each program thread is responsible for delaying itself or other program threads. Such systems often have complex synchronization hardware and required complicated software to maintain synchronization and coordination of program threads. The complex synchronization hardware increases chip size in an integrated system, and the complicated synchronization makes software longer and more difficult to develop.

Multiprocessor systems are sought which provide the high processing power, the flexibility of multiple separate program threads, and a simple method for synchronizing or coordinating the program threads.

SUMMARY OF THE INVENTION

In accordance with an embodiment of the invention, an integrated multiprocessor includes two processor with asymmetric program control. One processor, sometimes referred to herein as the control processor, executes a continuous program thread and can start and stop execution of a second program thread on the second processor, sometimes referred to herein as the co-processor. Both processors share an extended register set which facilitates communication for synchronization. The control processor uses access to the co-processor's registers to initialize the co-processor for a program thread which is later started. The co-processor does not have or require circuitry for control or access of the first processor. Accordingly, synchronization hardware is simplified.

The processors may have asymmetric instruction sets and architectures. The control processor, for example, implements instructions for reading and writing of the co-processor's registers, instructions for accessing the extended registers, an instruction for starting the co-processor, and an instruction for interrupting the co-processor. The co-processor implements instructions for accessing the extended registers but cannot access the control processor's registers. The co-processor's instructions which end a program thread signal completion of the program thread through an interrupt to the control processor and by setting a state flag in the extended registers to indicate the co-processor is idle. The control processor can poll the extended registers or use the interrupt mechanism to determine when the co-processor has completed tasks. Additionally, a synchronization flag in the extended register can be polled by either the control processor or co-processor to determine whether the other processor has completed a necessary precursor to continuing execution of a program thread. Using polling, the control processor and co-processor can be synchronized without stopping the co-processor. A special control processor instruction which both tests and sets a flag in the extended registers facilitates polling for synchronization.

In one embodiment of the invention, the control processor is a general-purpose processor and the co-processor is a vector processor having a single-instruction-multiple-data architecture. This embodiment is highly efficient because the vector processor provides high computational power which would be inefficiently utilized when implementing synchronization functions and the control processor which handles synchronization can be a relatively low power having a narrower data path than does the vector processor. The dual-processor architecture in this embodiment of the invention provides the high processing power of a large data path with multiple processing units in the vector processor, flexibility of two separate program threads, and simplicity in software synchronization primarily implemented through the control processor.

BRIEF DESCRIPTION OF THE DRAWINGS

Use of the same reference symbols in different figures indicates similar or identical items.

DETAILED DESCRIPTION OF THE PREFERRED EMBODIMENTS

A multiprocessor in accordance with an embodiment of the invention includes a pair of processors, each of which can execute a separate program thread in parallel with the other processor. Control and synchronization of execution is asymmetric with one processor being a master or control processor and the other processor being a slave or controlled processor. The control processor executes a continuous program thread which forks by starting execution of a second parallel program thread on the controlled processor. The second program thread joins the program thread when the controlled processor completes the second program thread and becomes idle. The controlled processor's instruction set includes instructions which upon execution terminate the second program thread and send an interrupt request to the control processor to indicate the second thread is complete.

Information can be passed between program threads via mechanisms including: the shared address space and memory of the processors, the controlled processor's register set which the control processor can access when the controlled processor is idle; and "extended" registers which are accessible to both processors. An exemplary extended register includes one or more flag bits which the controlled processor can set to indicate that a particular operation has been completed. Another flag bit indicates whether the controlled processor is running a previously started task or is idle. Using such flag bits, the control processor's program thread can include a wait loop which polls a flag bit to determine whether a result required from the controlled processor is ready. The controlled processor typically does not require software synchronization in its own program thread. Accordingly, software synchronization requires very little overhead.

Figure 1:
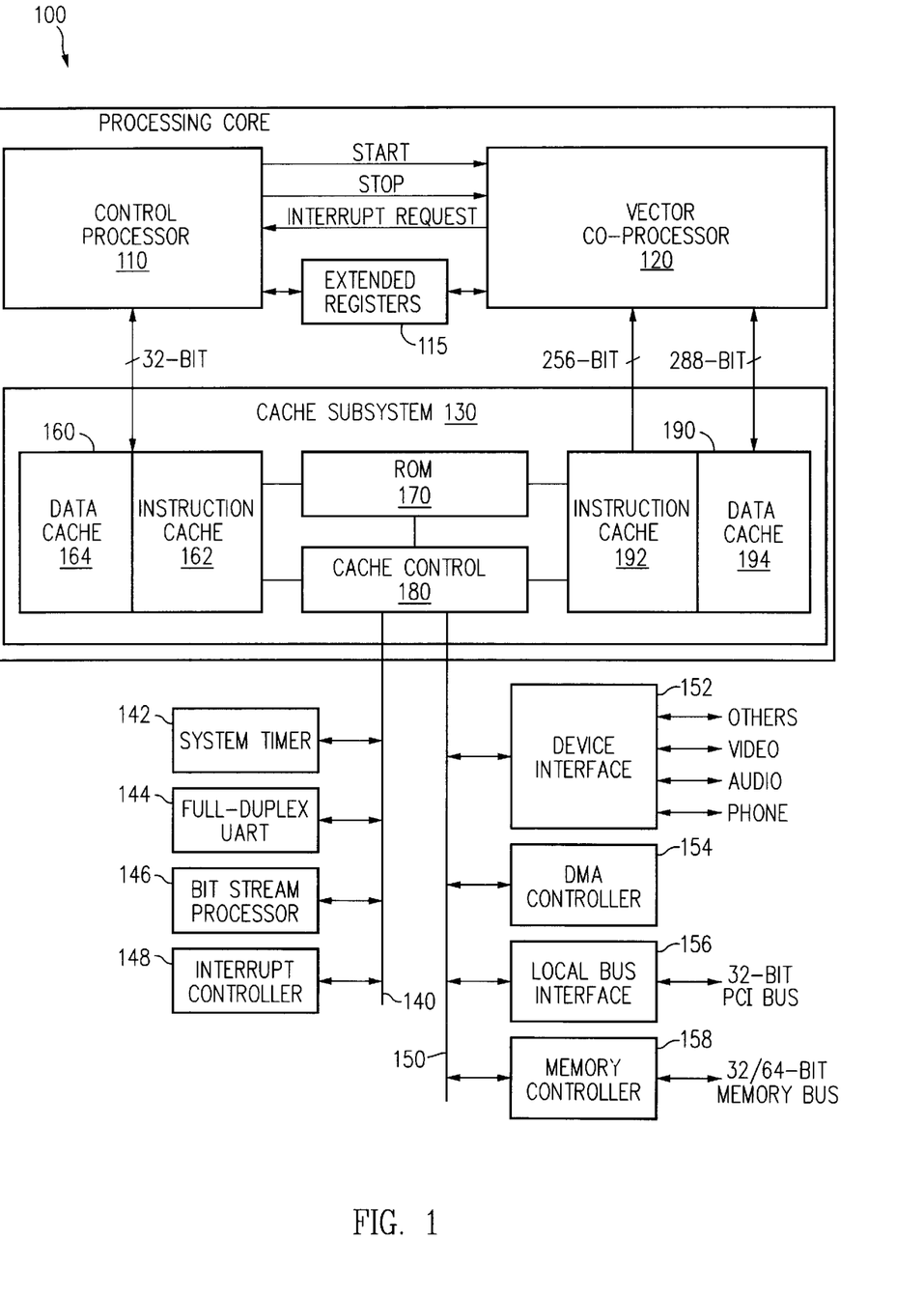
FIG. 1 is a block diagram of a multiprocessor in accordance with an embodiment of the invention.

FIG. 1 shows a block diagram of an embodiment of an integrated multiprocessor 100 in accordance with an embodiment of the invention. Multiprocessor 100 includes a general-purpose processor 110 and a vector processor 120 which are integrated on a monolithic semiconductor chip. Processors 110 and 120 connect to the other on-chip components of multiprocessor 100 through a cache subsystem 130 which contains SRAM 160 and 190, a ROM 170, and a cache control 180. Cache control 180 can configure SRAM 160 as an instruction cache 162 and a data cache 164 for processor 110 and configure SRAM 190 as an instruction cache 192 and data cache 194 for vector processor 120. Parts of SRAM 160 and 190 alternatively form a scratch pad memory within a shared address space of processors 110 and 120.

On-chip ROM 170 contains data and firmware for processors 110 and 120 and can also be accessed as a cache. ROM 170 typically contains: reset and initialization procedures; self-test diagnostics procedures; and interrupt and exception handlers. In an exemplary embodiment of the invention, multiprocessor 100 is for signal processing in multimedia applications and is sometimes referred to herein as a multimedia signal processor or MSP. For the exemplary embodiment, ROM 170 additionally contains subroutines for sound card emulation; subroutines for modem signal processing; subroutines for general telephony functions; 2-D and 3-D graphics subroutine libraries; and subroutine libraries for audio and video encoding and decoding standards such as MPEG-1, MPEG-2, H.261, H.263, G.728, and G.723. U.S. patent application Ser. No. 08/697,102, entitled "Multiprocessor Operation in a Multimedia Signal Processor", filed Aug. 19, 1996, further describes use of multiprocessors in multimedia applications and is incorporated by reference herein in its entirety.

Cache subsystem 130 connects processors 110 and 120 to two system busses 140 and 150 and operates as both a cache and a switching station for processor 110, processor 120, and the devices coupled to busses 140 and 150. System bus 150 operates at a higher clock frequency than bus 140 and is connected to faster devices such as a memory controller 158, a local bus interface 156, a DMA (direct memory access) controller 154, and a device interface 152 which respectively provide interfaces for an external local memory, a local bus of a host computer, direct memory accesses, and various analog-to-digital and digital-to-analog converters. Slower devices such as a system timer 142, a UART (universal asynchronous receiver transceiver) 144, a bitstream processor 146, and an interrupt controller 148 are connected to bus 140. The above-incorporated patent application entitled "Multiprocessor Operation in a Multimedia Signal Processor" further describes the operation of cache subsystem 130 and exemplary devices which processors 110 and 120 access through cache subsystem 130 and buses 140 and 150. U.S. patent application Ser. No. 08/699,303, entitled, "Methods and Apparatus for Processing Video Data", filed Aug. 19, 1996 describes a bitstream processor 146 for variable length encoding and decoding of bitstreams conforming to the MPEG standard and is incorporated by reference herein in its entirety.

Processors 110 and 120 execute separate program threads and are structurally different for more efficient execution of particular tasks. Processor 110 primarily executes of a real-time operating system, exception routines for both processors 110 and 120, and processes not requiring large numbers of repetitive calculations. Processor 110 also controls initialization, starting, and stopping of vector processor 120. Vector processor 120 mostly performs number crunching that involves repetitive operations on data blocks common in multimedia processing.

Figure 2:
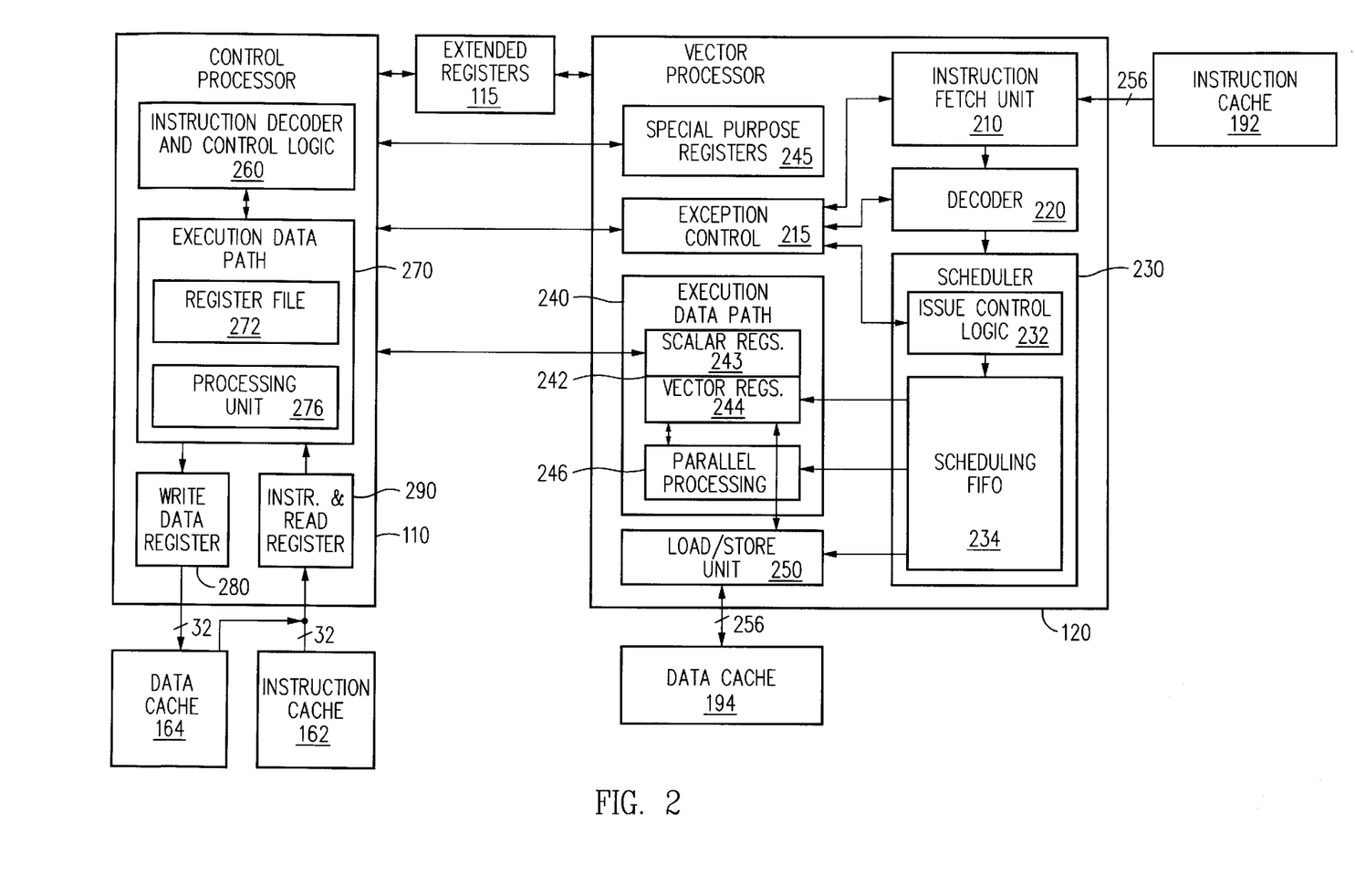
FIG. 2 is a block diagram illustrating an interface between a control processor and a vector processor in accordance with an embodiment of the invention.

FIG. 2. shows a block diagram illustrating the interactions between processor 110 and vector processor 120. Control processor 110 includes an instruction decoder 260 with control logic, an execution data path 270, and write and read registers 280 and 290. Processor 110 has a general-purpose architecture for processing scalar data values. In execution data path 270 of FIG. 2, a register file 272 includes a set of 32-bit data registers and a set of status registers, and a processing unit 276 has 32-bit bus for manipulation operands up to 32 bits in size.

In the exemplary embodiment, processor 110 is a 32-bit RISC processor which operates at 40 MHz and conforms to the architecture of an ARM7 RISC processor. The architecture and instruction set for an ARM7 RISC processor is described in the "ARM7DM Data Sheet", Document Number: ARM DDI 0010G which is available from Advance RISC Machines Ltd. The ARM7DM Data Sheet is incorporated by reference herein in its entirety. Appendix A describes an extension of the ARM7 instruction set for interactions between processor 110 and vector processor 120 or cache subsystem 130 in the exemplary embodiment.

In the embodiment of FIG. 2, vector processor 120 has an SIMD (single instruction multiple data) architecture and includes an instruction fetch unit (IFU) 210, a decoder 220, a scheduler 230, an execution data path 240, and a load/store unit (LSU) 250. IFU 210 fetches instructions and processes flow control instructions such as branches. Instruction decoder 220 decodes one instruction per cycle in the order of arrival from IFU 210 and writes field values decoded from the instruction to a FIFO 234 in scheduler 230. Issue control logic 232 in scheduler 230 selects the field values which are issued to execution data path 240 and LSU 250 as required to complete operations. Execution data path 240 executes logic/arithmetic instructions which manipulate vector or scalar data. Load/store unit 250 executes load/store instructions which access the shared address space of vector processor 120 and control processor 110. Exception control logic 215 is coupled to IFU 210, decoder 220, and scheduler 230 and issues an interrupt to control processor 110 when decoding or executing a vector processor instruction causes an exception.

In the exemplary embodiment, execution data path 240 contains parallel processing units 246 including eight 32-bit floating point units, eight 36-bit integer multipliers, and eight 36-bit arithmetic logic units (ALUs). Each of the 36-bit integer processing units can perform one operation on 32-bit data elements, two simultaneous operations on 16-bit data elements, or four simultaneous operations on 8-bit or 9-bit data elements. Parallel processing units 246 can handle 288-bit vector operands and 32-bit scalar operands. A register file 242 for execution data path 240 contains 288-bit vector registers 244, and most data paths in vector processor 120 are 288 or 576 bits wide to support simultaneous manipulation of up to 32 8-bit or 9-bit data elements, sixteen 16-bit data elements, or eight 32-bit data elements. With a SIMD architecture, parallel processing units 246 in vector processor 120 simultaneously execute and complete the same instruction.

Vector processor 120 consists of a pipelined RISC engine that operates at 80 MHz in the exemplary embodiment. The registers of vector processor 120 includes 32-bit special-purpose registers 245, a return address stack (not shown), 32-bit scalar registers 243, two banks of 288-bit vector registers 244, and two double-size (i.e. 576-bit) vector accumulator registers (not shown). Register file 242 includes thirty-two scalar registers which are identified in instructions by 5-bit register numbers ranging from 0 to 31, and sixty four 288-bit vector registers which are organized into two banks of thirty-two vector registers. Each vector register can be identified by a 1-bit bank number (0 or 1) and a 5-bit vector register number ranging from 0 to 31. Most instructions only access vector registers in a current bank as indicated by a control bit CBANK stored in a special-purpose (control/status) register VCSR of vector processor 120. A second control bit VEC64 indicates whether register numbers by default identify a double-size vector register including a register from each bank. The syntax of the instructions distinguishes register numbers identifying vector registers from register numbers identifying scalar registers and from register numbers identifying special-purpose registers.

Each vector register 244 can be partitioned into data elements of programmable size. For example, a 288-bit vector register can hold thirty-two 8-bit or 9-bit integer data elements, sixteen 16-bit integer data elements, or eight 32-bit integer or floating point data elements. Two vector registers logically combined as a double-size register store a vector having twice as many data elements. In the exemplary embodiment of the invention, setting control bit VEC64 places vector processor 120 in a mode VEC64 where double-size (576 bits) is the default for vector registers. U.S. patent application Ser. No. 08/699,585 entitled "SINGLE-INSTRUCTION-MULTIPLE-DATA PROCESSING IN A MULTIMEDIA SIGNAL PROCESSOR", filed Aug. 19, 1996 further describes the architecture and instruction set for the exemplary embodiment of vector processor 120 and is incorporated by reference herein in its entirety.

Multiprocessor 100 also contains a set of 32-bit extended registers 115 which are accessible to both processors 110 and 120. Extended registers 115 include privileged extended registers and user extended registers. The privileged extended registers control or indicate general operating modes for multiprocessor 100. The user extended register include registers for synchronization of program threads executed by processors 110 and 120. In the exemplary embodiment, the user extended registers include a vector processor state flag VPSTATE and a synchronization flag VASYNC. State flag VPSTATE has two values (VP_RUN and VP_IDLE) and indicates whether the vector processor 120 is running a program thread or is idle. In the exemplary embodiment, vector processor 120 views extended register VASYNC as its own special-purpose registers, and vector processor instructions such as instruction VMOV provide access to read or write register VASYNC. Other instructions implicitly access specific extended registers. For example, instructions such as VCINT and VCJOIN or any instruction generating an exception change the state flag VPSTATE to state VP_IDLE when a program thread is completed or halted for an exception. Extended registers VPSTATE and VASYNC have two read ports to allow both processors 110 and 120 to simultaneously read the registers.

Processor 110 can read or write scalar and special-purpose registers of vector processor 120 when vector processor 120 is in state VP_IDLE, but the results of processor 110 reading or writing a register of vector processor 120 while vector processor 120 is in state VP_RUN are undefined. The extension of the ARM7 instruction set for processor 110 includes instructions MFER and MTER which access extended registers 115 and instructions MFVP and MTVP which access the scalar or special-purpose registers of vector processor 120. A conditional instruction TESTSET reads an extended register and sets bit 30 of the extended register to 1 if a precedent condition is satisfied. Instruction TESTSET facilitates user/producer synchronization by reading a value that vector processor 120 clears to indicate a synchronization point and resetting bit 30 to prepare for a next synchronization point.

Processor 110 executes instructions STARTVP and INTVP to start and halt vector processor 120, and as indicated above, can access scalar and special purpose registers of vector processor 120. In contrast, vector processor 120 cannot start or stop processor 110 and cannot access the registers of processor 110. This asymmetric division of control between processors 110 and 120 simplifies synchronization of processors 110 and 120. In accordance with an aspect of the invention, vector processor 120 generates an interrupt request to processor 110 each time vector processor 120 becomes idled. For example, at the end of a typical program thread, vector processor 120 executes an instruction VCJOIN or VCINT which generates an interrupt request and places vector processor 120 in state VP_IDLE. Processor 110 can use interrupt handling routines to transfer results and restart vector processor 120. Thus, interrupt handlers can synchronize processors 110 and 120. U.S. pat. app. Ser. No. 08/699,295, entitled "System and Method for Handling Software Interrupts with Argument Passing" and U.S. pat. application Ser. No. 08/699,294, entitled "System and Method for Handling Interrupts and Exception Events in an Asymmetric Multiprocessor Architecture", both filed Aug. 19, 1996 describe exception and interrupt handling for an exemplary embodiment of the invention and are incorporated by reference herein in their entirety.

Figure 3:
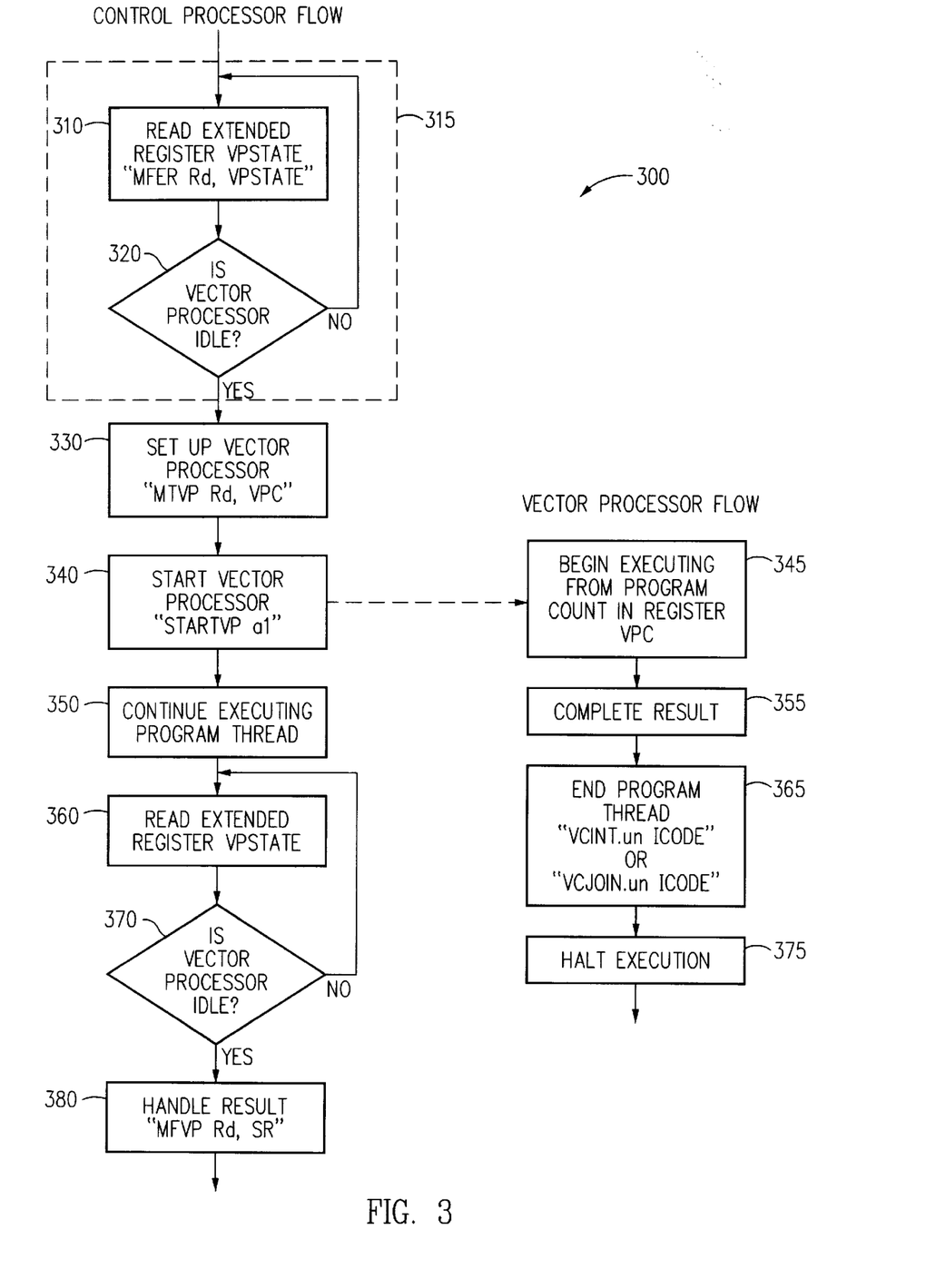
FIG. 3 is a flow diagram illustrating one method of synchronizing parallel program threads in accordance with an embodiment of the invention.

Polling processes can be used for synchronization instead of interrupt handlers. FIG. 3 is a flow diagram for an example dual threaded process 300 in accordance with an embodiment of the invention. Before starting a program thread on vector processor 120, processor 110 determines whether vector processor 120 is running or idle by executing a wait loop 315 including steps 310 and 320 which determine the value of register VPSTATE. Vector processor 120 is idle after multiprocessor 100 is started or reset and after vector processor 120 executes an instruction which generates an exception.

U.S. patent application Ser. No. 08/703,434, entitled "Efficient Context Saving and Restoring in Multiprocessors", filed Aug. 19, 1996 describes a context changing process which processors 110 and 120 can use and is incorporated by reference herein in its entirety. In the context saving process, vector processor 120 periodically executes a conditional context saving instruction VCCS which jumps to a context saving subroutine if a flag bit CSE in an extended register VIMSK is set. At the end of the context-saving subroutine, vector processor 120 can execute instruction VCINT or VCJOIN and enter the state VP_IDLE. Accordingly, in an exemplary context saving process, processor 110 sets flag bit CSE and waits for vector processor 120 to become idle as in wait loop 315.

Processor 110 remains in wait loop 315 and continues to poll extended register VPSTATE until vector processor 120 is idle. Once vector processor 120 is idle, processor 110 executes step 330 to set up vector processor 120 for a new program thread. In step 330, processor 110 can write a program address to a special-purpose register VPC which is the program counter of vector processor 120. Processor 110 can also write to other scalar and special-purpose registers of vector processor 120 to pass parameters to vector processor 120. Once vector processor 120 is initialized, processor 110 executes step 340 in which an instruction STARTVP starts vector processor 120 executing a program thread in a step 345. Instruction STARTVP sets register VPSTATE to state VP_RUN, and vector processor 120 upon reading value VP_RUN begins fetching and executing instructions. At this point, processors 110 continues executing its program thread so that processors 110 and 120 operate in parallel.

In process 300, processor 110 can continue execution of its program thread, but a step 380 must be synchronized with a result from vector processor 120. Vector processor 120 in executing its program thread completes the results in step 355 and executes an instruction VCINT or VCJOIN in step 365 which halts execution in step 375. To ensure that step 380 occurs after step 355, processor 110 executes a wait loop including steps 360 and 370 and waits until vector processor 120 is idle. One possible order of events is that processor 110 reaches step 360 before vector processor 120 executes step 365. In this case, processor 110 executes instructions 360 and 370 repeatedly until vector processor 120 becomes idle. A second possible order of events is that processor 120 executes step 365 before processor 110 reaches step 360. In the second case, processor 110 executes steps 360 and 370 once.

In step 380, processor 110 handles the result and may simply initialize and restart vector processor 120 with another STARTVP instruction. In the event that there may have been a context switch for the previous program thread, processor 110 can initialize vector processor 120 with the address of a subroutine which restores the previously saved context and resumes the interrupted program thread.

Figure 4:
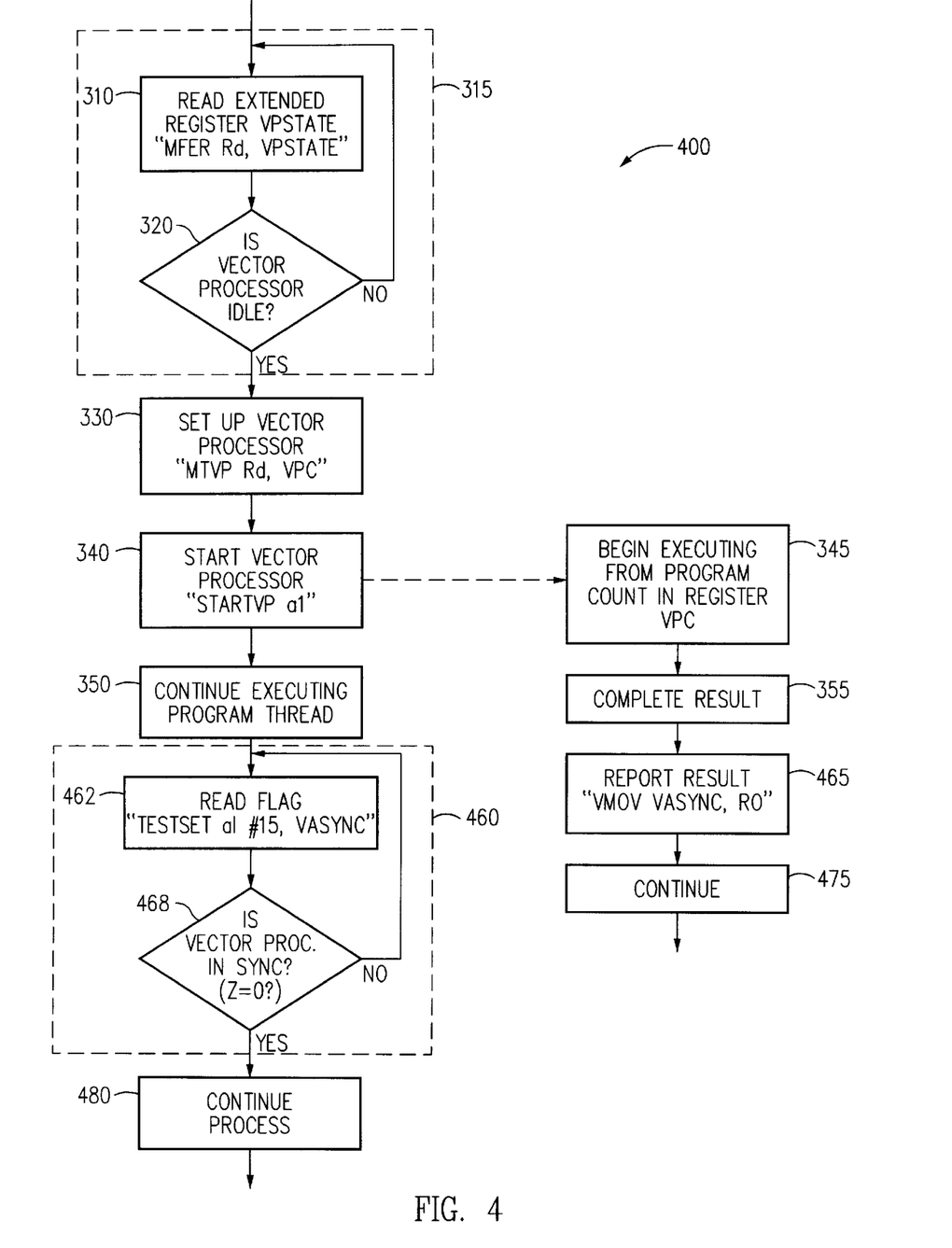
FIG. 4 is a flow diagram illustrating another method of synchronizing parallel program threads in accordance with an embodiment of the invention.

FIG. 4 shows another example dual-threaded process 400 using polling for synchronization in accordance with an embodiment of the invention. Process 400 begins as described above for process 300 illustrated in FIG. 3. In particular, processor 110 remains in a wait loop 315 until vector processor 120 is idle, sets up vector processor 120 in step 330, and starts vector processor 120 in step 340 in response to which vector processor 120 begins executing a program thread in step 345. In process 400, processor 110 requires that vector processor 120 complete a result in a step 355 before processor 110 executes a step 480. Process 400 differs from process 300 in that vector processor 120 does not enter the idle state following execution of step 455 so that register VPSTATE is not used for synchronization. Instead, a loop 460 polls extended register VASYNC to synchronize steps 480 and 355.

In loop 460, a first step 462 reads extended register VASYNC. In the exemplary embodiment, processor 110 can read extended registers using instruction TESTSET which reads an extended register and sets a flag bit (bit <30>) of the register. When register number 15 is used as the destination of instruction TESTSET, the flag bit is transferred to a Z (or zero) bit in a status register of processor 110. Process 400 depends on vector processor 120 clearing the flag bit to indicate that step 355 has been completed, so that instruction 468 can determine whether step 355 has been completed by branching back to step 462 when status bit Z is not equal to zero. When the flag bit was zero, processor 110 moves to step 480 and continues processing. Use of instruction TESTSET in step 462 has the advantage that the flag bit in extended register VASYNC is automatically reset for a future synchronization loop identical to loop 460.

Figure 5A:
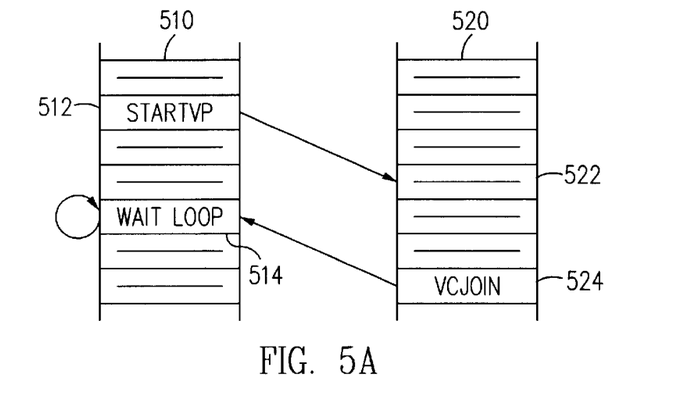
FIGS. 5A, 5B, and 5C illustrate parallel and sequential software architectures for the multiprocessor of FIG. 1.
Figure 5B:
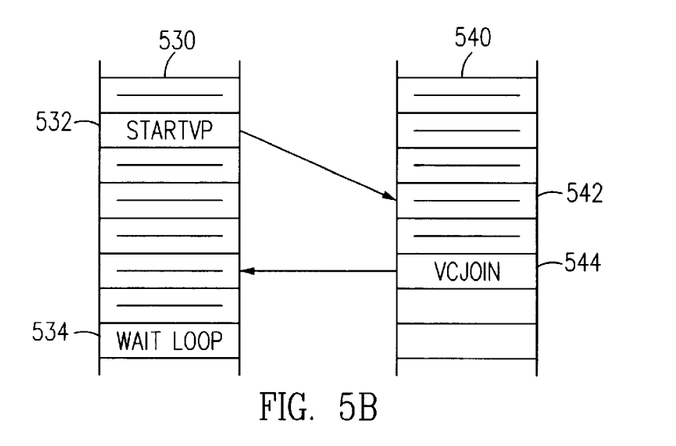

Using control processor instruction VPSTART and vector processor instruction VCJOIN, multiprocessor 100 of FIG. 1 can support parallel-execution and sequential-execution programming paradigms. FIGS. 5A and 5B illustrate two cases for the parallel-execution paradigm. In FIG. 5A, processor 110 executes an instruction stream 510 which forks off an execution thread 520 for vector processor 120. A STARTVP instruction 512 specifies a target address at which vector processor 120 begins fetching instructions. Accordingly, a first instruction 522 executed by vector processor 120 follows instruction 512 and is executed in parallel with instructions executed by processor 110. Processor 110 continues executing its instruction stream until reaching a wait loop 514 such as described above in regard to FIGS. 3 and 4. Vector processor 120 executes its instruction stream until reaching a VCJOIN instruction 524 which clears register VASYNC and places vector processor 120 in idle mode. (In an alternative embodiment, vector processor 120 issues an interrupt request to processor 110, and an interrupt handler executed by processor 110 clears register VPSTATE.) In FIG. 5A, processor 110 reaches wait loop 514 before processor 120 reaches VCJOIN instruction 524, and processor 110 spin waits until vector processor 120 completes its assigned task.

Alternatively, as illustrated in FIG. 5B, vector processor 120 completes an instruction stream 540, starting with an instruction 542 and ending with a VCJOIN instruction 544, before processor 110 reaches a wait loop 534. In this case, processor 110 does waste time spin waiting but instead pass through wait loop 534. However, vector processor 120 is idle from when VCJOIN instruction 564 is executed until after wait loop 534 when processor 110 can again start vector processor 120.

The parallel programming paradigm provides high performance because a multithreaded parallel program can exploit the power of vector processor 120 while executing a scalar portion of a computation in parallel on processor 110. Data communication between processors 110 and 120 occurs at synchronization points marked by wait loops executed by processor 110. No spin waiting is required of vector processor 120.

Figure 5C:
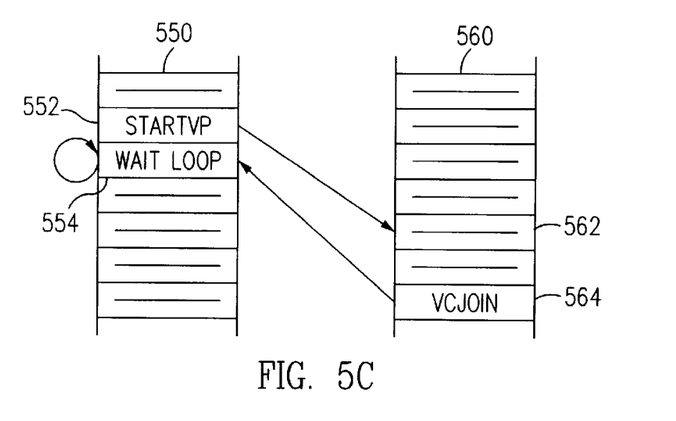

FIG. 5C illustrates a sequential-execution programming paradigm for multiprocessor 100 of FIG. 1. In the sequential programming paradigm, processor 110 forks off an execution thread with a STARTVP instruction 552 and immediately enters a wait loop 554. Processor 110 waits in loop 554 until vector processor 120 completes a program sequence 560 from an instruction 562 to a VCJOIN instruction 564. When vector processor 120 executes VCJOIN instruction 564 and becomes idle, processor 110 exits wait loop 554 and begins executing instructions which sequentially follow instructions 562 to 564. The sequential-execution programming paradigm is not as efficient as the parallel-execution programming paradigm but may be logically simpler.

A variation on the sequential-execution programming paradigm of FIG. 5C or the parallel-execution paradigm of FIG. 5B has vector processor 120 execute an entire program, while the sole functions of processor 110 are starting vector processor 120 and handling interrupts and exceptions. This variation may be useful in the exemplary embodiment where vector processor 120 operates at twice the operating frequency of, and is much more powerful than processor 110.

Although the present invention has been described with reference to particular embodiments, the description is only an example of the invention's application and should not be taken as a limitation. Various adaptations and combinations of features of the embodiments disclosed are within the scope of the invention as defined by the following claims.

APPENDIX A

In the exemplary embodiment, processor 110 is a general-purpose processor which complies with the standard for an ARM7 processor. Refer to the ARM7 Data Sheet (document number ARM DDI 0020C, issued Dec 1994) for a description of ARM7 registers and instruction set. An extension to the ARM7 instructions set allows processor 110 to interact with vector processor 120 by: starting or stopping vector processor 120; testing the vector processor state, including for synchronization; and transferring data between a register in vector processor 120 to a register in processor 110 or an extended register. Transfer between a general register and a vector register requires an intermediate storage, for example, in local memory.

Table A.1 describes the extension to the ARM7 instruction set for processor 110 to initiate interactions with vector processor 120 and cache subsystem 130.

TABLE A.1

| ARM7 Instruction Set Extension | |
|---|---|
| Instruction | Result |
| STARTVP | STARTVP causes the vector processor to enter the VP_RUN state but has no affect if the vector processor is already in the VP_RUN state. STARTVP is a processor-data (CDP) class instruction. No result is communicated back to the ARM7, and the ARM7 continues its execution. |
| INTVP | INTVP causes the vector processor to enter state VP_IDLE but has no affect if the vector processor is already in state VP_IDLE. INTVP is a processor data (CDP) class instruction. No result is communicated back to the ARM7, and the ARM7 continues its execution. |
| TESTSET | This instruction reads a user extended register and sets bit 30 of the register to 1 to provide producer/consumer type of synchronization between the vector and ARM7 processors. TESTSET is a processor register transfer (MRC) class |

TABLE A.1-continued

| ARM7 Instruction Set Extension | |
|---|---|
| Instruction | Result |
| | instruction. The ARM7 processor is stalled until the instruction is executed (e.g. the data is transferred) |
| MFER | Moves data from an extended register to an ARM general register. MFER is a processor register transfer (MRC) class instruction. The ARM7 processor is stalled until the instruction is executed. |
| MFVP | Moves from a vector processor scalar/special-purpose register to an ARM7 general register. Unlike the other ARM7 instructions, this instruction should be executed only when the vector processor is in state VP_IDLE. The result is otherwise undefined. MFVP is a processor register transfer (MRC) class instruction. The ARM7 processor is stalled until the instruction is executed. |
| MTER | Moves to an extended register from an ARM7 general register. MTER is a co-processor register transfer (MCR) class instruction. The ARM7 processor is stalled until the instruction is executed. |
| MTVP | Moves to a vector processor scalar/special-purpose register from an ARM7 general register. This instruction should be expected only when the vector processor is in state VP_IDLE. The result is otherwise undefined. MTVP is a co-processor register transfer (MCR) class instruction. The ARM7 processor is stalled until the instruction is executed. |
| CACHE | Provides software management of the ARM7 data cache. |
| PFTCH | Prefetches one cache line into the ARM7 data cache. |
| WBACK | Writes back one cache line from the ARM7 data cache into memory. |

Table A.2 lists ARM7 exceptions, which are detected and reported prior to executing the faulting instruction. The exception vector address is given in hexadecimal notation.

TABLE A.2

| ARM7 Exceptions | |
|---|---|
| Exception Vector | Description |
| 0x00000000 | Reset |
| 0x00000004 | Undefined Instruction Exception |
| 0x00000004 | Vector Processor Unavailable Exception |
| 0x00000008 | Software Interrupt |
| 0x0000000C | Single Step Exception |
| 0x0000000C | Instruction Address Breakpoint Exception |
| 0x00000010 | Data Address Breakpoint Exception |
| 0x00000010 | Invalid Data Address Exception |
| 0x00000018 | Protection Violation Exception |

The following describes the syntax of the extension to the ARM7 instruction set. The ARM architecture provides three instruction formats for co-processor interface:

1. co-processor data (CDP) format
2. co-processor data transfers (LDC/STC) format
3. co-processor register transfers (MRC/MCR) format CDP format instructions are for the operations that do not communicate back to the ARM7 processor. Table A.3 defines the fields of a CDP-format instruction.

TABLE A.3

CDP Fields

| Field | Bits | Meaning |
|---|---|---|
| Cond | <31:28> | Condition field. This field specifies the condition in which the instruction is to execute. |
|  | <27:24> | 1110 |
| Opc | <23:20> | Co-processor operation code. |
| CRn | <19:16> | Co-processor operand register |
| CRd | <15:12> | Co-processor destination register |
| CP# | <11:8> | Co-processor number. The following co-processor numbers are currently used: 1111 - ARM7 data cache 0111 - vector processor and extended registers |
|  | <4> | 0 |
| CRm | <3:0> | Co-processor operand register. |

Co-processor data transfer format (LDC/STC) loads or stores a subset of a co-processor's registers directly from or to memory. The ARM7 processor supplies a word address, and the co-processor supplies or accepts the data and controls the number of words transferred. Table A.4 defines fields in the LDC/STC format.

TABLE A.4

LDC/STC Format

| Field | Bits | Meaning |
|---|---|---|
| Cond | <31:28> | Condition field. This field specifies the condition in which the instruction is to execute. |
|  | <27:25> | 110 |
| P | <24> | Pre/Post indexing bit. |
| U | <23> | Up/Down bit. |
| N | <22> | Transfer length. (Due to not having enough bits in the CRd field, the N bit is used as a part of source or destination register identifier.) |
| W | <21> | Write-back bit. |
| L | <20> | Load/store bit. |
| Rn | <19:16> | Base register. |
| CRn | <15:12> | Co-processor source/destination register. |
| CP# | <11:8> | Co-processor number. (The following co-processor numbers are used: 1111-ARM 7 data cache 0111-vector processor, extended registers.) |
| Offset | <7:0> | Unsigned 8 bit immediate offset. |

Co-processor register transfer format (MRC, MCR) is used to communicate information directly between the ARM7 registers and co-processor registers. Table A.5 defines the fields of an instruction having MRC/MCR format.

TABLE A.5

MRC, MCR format

| Field | Bits | Meaning |
|---|---|---|
| Cond | <31:28> | Condition field. This field specifies the condition in which the instruction is to execute. |
|  | <27:24> | 1110 |
| Opc | <23:21> | Co-processor operation code. |
| L | <20> | Load/Store bit. L = 0 move to vector processor L = 1 move from vector processor |
| CRn | <19:16> | Co-processor source/destination register. Only CRn<1:0>:CRm<3:0> are used. |
| Rd | <15:12> | ARM source/destination register |

TABLE A.5-continued

MRC, MCR format

| Field | Bits | Meaning |
|---|---|---|
| CP# | <11:8> | Co-processor number. The following co-processor numbers are currently used: 1111 - ARM 7 data cache 0111 - vector processor, extended registers |
| CP | <7:5> | Co-processor information. |
| CRm | <3:0> | Co-processor source/destination register. Bits CRn<1:0>:CRm<3:0> are used. |

EXTENDED ARM INSTRUCTIONS

The extended ARM instructions are as follows.
CACHE (Cache Operation)
Format: LDC/STC
with L=O; CRn=Opc; and CP#=1111.
Assembler Syntax:
STC{cond} pl5,cOpc, <Address>
CACHE{cond} Opc, <Address>
where cond={eq, ne, Cs, cc, mi, pl, vs, vc, hi, ls, ge, lt, gt, le, al, nv} and Opc={0, 1, 2, 3}. For instruction CACHE, field CRn of the LDC/STC format specifies the opcode Opc. Thus, the decimal representation of the opcode is preceded by the letter 'c' (e.g. use co instead of 0) in the first syntax. Refer to the ARM7 Data Sheet for the address mode syntax.
Description:
Instruction CACHE is executed only if Cond is true. Field Opc<3:0> specifies the following operations:

TABLE A.7

CACHE Instruction Opc Definition

| Opc<3:0> | Meaning |
|---|---|
| 0000 | Writeback and invalidate the dirty cache line specified by the EA. If the matching line contains clean data, the line is invalidated without the writeback. If no cache line is found to contain the EA, the data cache remains intact. |
| 0001 | Writeback and invalidate the dirty cache line specified by the index of the EA. If the matching line contains clean data, the line is invalidated without the writeback. |
| 0010 | Used by PFTCH and WBACK instructions. |
| 0011 | Invalidate the cache line specified by the EA. The cache line is invalidated (without writeback) even if the line is dirty) This is a privileged operation, and will cause ARM7 Protection Violation if attempted in the user mode. |
| others | reserved. |

Refer to the ARM7 Data Sheet for how the EA is calculated.
Exception: ARM7 Protection Violation.
INTVP (Interrupt Vector Processor)
Format: CDP
where Opc=0001; 0; CP#=0111; and CRn, CRd, CP, and CRm are unused.
Assembler Syntax:
CDP{cond} p7, 1, cO, cO, cO
INTVP{cond}
where cond={eq, ne, cs, cc, mi, pl, vs. vc, hi, ls, ge, lt, gt, le, al, nv}. Bits 19:12, 7:15 and 3:0 are reserved.

Description:
When Cond is true, instruction INTVP signals the vector processor to halt. In one embodiment, instruction INTVP sets bit CSE to indicate the vector processor should save its current context and halt the next time the vector processor executes a conditional context save instruction VCCS. The ARM7 processor continues to execute the next instruction without waiting for the vector processor to halt. The ARM7 processor should execute a MFER busy-wait loop to see if the vector processor has halted after the INTVP instruction. The INTVP instruction has no affect if the vector processor is already in the VP_IDLE state.
Exception: Vector processor unavailable.
MFER Move From Extended Register
Format: MCR
where Opc=010; L=1; CRn=cP; CP#=0111; CP is unused; CRm=ER
Assembler Syntax:
MRC{cond} p7, 2, Rd, cP, cER, 0
MFER{cond} Rd, RNAME
where cond={eq, ne, cs, cc, mi, pl, vs, vc, hi, ls, ge, lt, gt, le, al, nv}, Rd={r0, . . . r15}, P={0, 1}, ER={0, . . . , 15} and RNAME refer to an extended register.
Description:
Instruction MFER is executed only if Cond is true.
Data from an extended register ER identified by P:ER<3:0> as shown in Table A.9 below is moved to ARM7 register Rd.

TABLE A.9

ER, P Mapping to Extended Registers

| ER<3:0> | P = 0 | P = 1 |
| --- | --- | --- |
| 0000 | UER0 | PER0 |
| 0001 | UER1 | PER1 |
| 0010 | UER2 | PER2 |
| 0011 | UER3 | PER3 |
| 0100 | UER4 | PER4 |
| 0101 | UER5 | PER5 |
| 0110 | UER6 | PER6 |
| 0111 | UER7 | PER7 |
| 1000 | UER8 | PER8 |
| 1001 | UER9 | PER9 |
| 1010 | UER10 | PER10 |
| 1011 | UER11 | PER11 |
| 1100 | UER12 | PER12 |
| 1101 | UER13 | PER13 |
| 1110 | UER14 | PER14 |
| 1111 | UER15 | PER15 |

Exception:
Protection violation when attempt to access PERx while in user mode.
MFVP Move from Vector Processor
Format: MRC/MCR
where Opc=001; L=1; CP#=0111; and CP unused.
Assembler Syntax:
MRC{cond} p7,1,Rd,Crn,CRm,0
MFVP{cond} Rd,RNAME
where cond={eq, ne, cs, cc, mi, pl, vs, vc, hi, ls, ge, lt, gt, le, al, nv}, Rd={R0, . . . r15}, CRn=({c0, . . . c15}, CRm={c0, . . . c15)}, and RNAME refer to scaler or special-purpose registers in the vector processor.
Description:
Instruction MFVP is executed only if Cond is true.
Data from the vector processor's scalar or special-purpose register identified by CRn<1:0>:CRm<3:0> is moved to an ARM7 register Rd.

Bits CRn<3:2> are reserved. Table A.10 shows the mapping from CRn<1:0>: CRm<3:0> scalar registers SR0 to SR15 and special-purpose registers SP0 to SP15 in the vector processor.

TABLE A.10

Mapping from CRn:CRm to VP Registers

| CRM<3:0> | CRn<1:0> = 00 | CRn<1:0> = 01 | CRn<1:0> = 10 | CRn<1:0> = 111 |
| --- | --- | --- | --- | --- |
| 0000 | SR0 | SR16 | SP0 | RASR0 |
| 0001 | SR1 | SR17 | SP1 | RASR1 |
| 0010 | SR2 | SR18 | SP2 | RASR2 |
| 0011 | SR3 | SR19 | SP3 | RASR3 |
| 0100 | SR4 | SR20 | SP4 | RASR4 |
| 0101 | SR5 | SR21 | SP5 | RASR5 |
| 0110 | SR6 | SR22 | SP6 | RASR6 |
| 0111 | SR7 | SR23 | SP7 | RASR7 |
| 1000 | SR8 | SR24 | SP8 | RASR8 |
| 1001 | SR9 | SR25 | SP9 | RASR9 |
| 1010 | SR10 | SR26 | SP10 | RASR10 |
| 1011 | SR11 | SR27 | SP11 | RASR11 |
| 1100 | SR12 | SR28 | SP12 | RASR12 |
| 1101 | SR13 | SR29 | SP13 | RASR13 |
| 1110 | SR14 | SR30 | SP14 | RASR14 |
| 1111 | SR15 | SR31 | SP15 | RASR15 |

SR0 always reads as 32 bits of zeros and a write to SR0 is ignored.
Exception: Vector processor unavailable.
MTER Move To Extended Register
Format: MRC/MCR
where Opc=010; L=0, CRn=cP; CP#=0111; CP is unused; and CRm=ER.
Assembler Syntax:
MRC{cond} p7, 2, Rd, cP, cER, 0
MFER{cond} Rd, RNAME
where cond={eq, ne, cs, cc, mi, pl, vs. vc, hi, ls, ge, lt, gt, le, al, nv}, Rd={r0, . . . r15}, P={0, 1}, ER={0 , . . . 15} and RNAME refers to a register mnemonic (e.g. PER0).
Description:
Instruction MTER is executed only if Cond is true.
Data from an ARM7 register Rd is moved to the extended register ER specified with P:ER<3:0>, as shown in Table A.9 above.
Exception:
Protection violation when attempt to access PERx while in user mode.
MTVP Move To Vector Processor
Format: MRC/MCR
where Opc=1; L=0; CP#=0111; and CP is unused.
Assembler Syntax:
MRC{cond} p7,1,Rd,CRn,CRm,0
MFVP{cond} RNAME,Rd
where cond={eq, ne, cs, cc, mi, pl, vs. vc, hi, ls, ge, lt, gt, le, al, nv}, Rd={r0, . . . r15}, CRn=({c0, . . . c15}, CRm={c0, . . . c15}, and RNAME refers to a register mnemonic (e.g. SP0 or VCSR).
Description:
Instruction MTVP is executed only if Cond is true.
Data from the ARM7 register Rd is moved to the vector processor's scalar/special-purpose register CRn<1:0>:CRm<3:0>. The mapping of CRn:CRm to the scalar and special-purpose registers of vector processor are show in Table A.10 above.
Exception: Vector processor unavailable.

PFTCH Prefetch
Format: LDC/STC
with N=0; L=1; CRn=0010; and CP#=1111.
Assembler Syntax:
LDC{cond} p15, 2, <Address>
PFTCH{cond} <Address>
where cond={eq, ne, cs, cc, mi, pl, vs, vc, hi, ls, ge, lt, gt, le, al, nv}. Refer to the ARM7 Data Sheet for the address mode syntax.
Description:
Instruction PFTCH is executed only if Cond is true. A cache line specified by the EA is prefetched into the ARM7 data cache. Refer to the ARM7 Data Sheet on how the EA is calculated.
Exception: None
STARTVP Start Vector Processor
Format: CDP format
with Opc=0000; CP#=0111; and CRn, CRd, CP, and CRm are unused.
Assembler Syntax:
CDP{cond} p7, 0, c0, c0, c0
STARTVP {cond}
where cond={eq, ne, cs, cc, mi, pl, vs, vc, hi, ls, ge, lt, gt, le, al, nv}.
Description:
Instruction STARTVP is executed only if Cond is true. Instruction STARTVP signals the vector processor to start execution and automatically clears VISRC<vjp> and VISRC<vip>. The ARM7 processor continues to execute the next instruction without waiting for the vector processor to start execution. The vector processor must be initialized to the desired state before this instruction is executed. Instruction STARTVP has no affect if the vector processor is already in state VP_RUN.
Exception: Vector processor unavailable.
TESTSET Test and Set
Format: MRC/MCR
with Opc=000; L=1; CRn=0; CP#=0111; CRm ER; and CP unused.
Assembler Syntax:
MRC{cond} p7, 0, Rd, c0, cER, 0
TESTSET{cond} Rd, RNAME
where cond={eq, ne, cs, cc, mi, pl, vs. vc, hi, ls, ge, it, gt, le, al, nv}, Rd={r0, . . . r15}, ER={0, . . . 15}, and RNAME refers to a register mnemonic (e.g. UER1 or VASYNC).
Description:
Instruction TESTSET is executed only if Cond is true. Instruction TESTSET returns the contents of extended register UERx to general register RD and sets UERx<30> to 1. If the ARM7 register 15 is specified as the destination register, the UERx<30> is returned at bit Z of register CPSR such that a short wait loop can be implemented.
Exception: None

APPENDIX B

This appendix describes instructions VCINT, VCJOIN, and VMOV which the vector processor uses to support synchronization with the control processor in the exemplary embodiment of the invention. Above-incorporated patent application entitled "SINGLE-INSTRUCTION-MULTIPLE-DATA PROCESSING IN A MULTIMEDIA SIGNAL PROCESSOR", filed Aug. 19, 1996 describes the entire instruction set for the vector processor. Instruction operation are defined using constructs as define be C programming languages.

VCINT Conditional Interrupt ARM7

TABLE B.1

VCINT Format

| Field | Bits | Description |
| --- | --- | --- |
| | <32:26> | 100111 |
| Cond | <25:23> | Condition Code. |
| ICODE | <22:0> | Interrupt Code. |

Assembler Syntax:

VCINT.cond #ICODE where cond={un, lt, eq, le, gt, ne, ge, ov}.
Description:
If Cond is true, halt execution and interrupt ARM7 processor, if interrupt is enabled.
Operation:

```
If ( (Cond == VCSR[SO,GT, EQ,LT]) | (Cond == Un) )
    {VISRC<vip> = 1;
    VIINS = [VCINT.cond #ICODE instruction];
    VEPC = VPC;
    if (VIMSK<vie> == 1) signal ARM7 interrupt;
    VP_STATE —— VP_IDLE;
}
else VPC = VPC + 4;
```

Exception: VCINT interrupt.
VCJOIN Conditional Join With ARM7 Task

TABLE B.2

VCJOIN Format

| Field | Bits | Description |
| --- | --- | --- |
| | <32:26> | 100100 |
| Cond | <25:23> | Condition Code. |
| ICODE | <22:0> | Interrupt Code. |

Assembler Syntax:

VCJOIN.cond #Offset where cond={un, lt. eq, le, gt, ne, ge, ov}.
Description:
If Cond is true, halt execution and interrupt ARM7 processor, if interrupt enabled.
Operation:

```
If ( (Cond == VCSR[SO, GT, EQ,LT]) | (Cond == un)
) {
    VISRC<vjp >= 1;
    VIINS = [VC.JOIN.cond #Offset instruction];
    VEPC = VPC;
    if (VIMSK<vje> ==1) signal ARM7 interrupt;
    VP_STATE = VP_IDLE;
}
else VPC = VPC + 4;
```

Exception: VCJOIN interrupt.
VMOV Move

TABLE B.3

VMOV Format

| Field | Bits | Description |
|---|---|---|
|  | <32:23> | 011011000 |
|  | <22> | Unused |
| DS | <21:20> | Data Size |
|  | <19:15> | Unused |
| Rd | <14:10> | Destination Register Number |
| Group | <9:5> | Group identifier for source and destination registers |
| Rb | <4:0> | Source Register Number |

Assembler Syntax:
VMOV.dt Rd,Rb
where dt={b, b9, h, w, f}, Rd and Rb denote register names. Suffix .w and .f denote the same operation.
Supported Modes:
int8(b), int9(b9), int16(h), and int32(w)
Description:
The content of register Rb is moved to register Rd. Field Group specifies the source and destination register groups as defined in Table B.4.

TABLE B.4

Group Field Definition

| Group <3:0> | Source Group | Dest. Group | Comments |
|---|---|---|---|
| 0000 |  |  | reserved |
| 0001 | VR | VRA |  |
| 0010 | VRA | VR |  |
| 0011 | VRA | VRA |  |
| 0100 |  |  | reserved |
| 0101 |  |  | reserved |
| 0110 | VRA | VAC |  |
| 0111 | VAC | VRA |  |
| 1000 |  |  | reserved |
| 1001 | SR | VRA |  |
| 1010 |  |  | reserved |
| 1011 |  |  | reserved |
| 1100 | SR | SP |  |
| 1101 | SP | SR |  |
| 1110 | SR | RASR |  |
| 1111 | RASR | SR |  |

In Table B.4, the register group notation is:

VR current bank vector register
VRA alternate bank vector register
SR scalar register
SP special-purpose register
RASR return address stack register
VAC vector accumulator register (see Table B.5).

A vector register cannot be moved to a scalar register with instruction VMOV but can be with an instruction VEXTRT.
Table B.5 defines VAC register number encodings.

TABLE B.5

VAC Register Number

| R<2:0> | Register | Comments |
|---|---|---|
| 000 |  | undefined |
| 001 | VAC0L |  |
| 010 | VAC0H |  |
| 011 | VAC0 | Specifies both VAC0H:VAC0L. If specified as the source, the VRd + 1:VRd register pair are updated. VRd must be an even register. |
| 100 |  | undefined |
| 101 | VAC1L |  |
| 110 | VAC1H |  |
| 111 | VAC1 | Specifies both VC1H:VAC1L. If specified as the source, the VRd + 1:VRd register pair are updated. VRd must be an even register. |

Operation:
Rd=Rb
Exception:
Setting an exception status bit in VCSR or VISRC will cause the corresponding exception.
Programming Note:
Instruction VMOV is not affected by the element mask. Since the alternate bank concept does not exist in VEC64 mode, instruction VMOV cannot be used for moving from or to an alternate bank register in VEC64 mode.

We claim:

1. An integrated multiprocessor comprising:
a first processor;
a second processor operable in a first state to execute a sequence of program instructions, and operable in a second state where the second processor is idle; and
a register coupled to enable both the first processor and the second processor to access the register, the register storing a value controls whether the second processor is in the first or second state wherein:
the first processor implements a first instruction set including a first instruction that when executed by the first processor starts the second processor executing the sequence of program instructions and a second instruction that when executed by the first processor idles the second processor; and
the second processor implements the second instruction set lacking instructions that allow the second processor to start or halt execution by the first process and including a third instruction that generates an interrupt to the first processor, the interrupt indicating that the second processor has completed an operation that the first processor started the second processor executing.

2. The multiprocessor of claim 1, wherein:
the first processor includes a first execution data path permitting manipulation of operands having a width in bits of up to but not exceeding a first maximum width; and
the second processor includes a second execution data path permitting manipulation of operands having a width in bits of up to but not exceeding a second maximum width which is greater than the first maximum width.

3. The multiprocessor of claim 2, wherein the second processor includes a plurality of processing units capable of operating in parallel.

4. The multiprocessor of claim 3, wherein the second processor has a single-instruction-multiple-data architecture.

5. The multiprocessor of claim 1, further comprising a semiconductor substrate on which the first processor, the second processor, and the register are formed.

6. A method for operating a multiprocessor, the method comprising:

executing a first program thread on a first processor;

starting a second program thread on a second processor in response to a first instruction executed by the first processor;

executing a loop in the first program thread, wherein in the loop comprises a second instruction and executing the second instruction comprises the first processor reading a register which is accessible by both the first and second processors and setting a flag in the register to indicate the second processor has not completed a task;

writing a value to the register indicating that the second processor has completed at least a first portion of the second program thread, wherein the second processor when writing the value, sets the flag in the register to indicate the second processor has completed the task; and exiting the loop in response to the first processor reading the value indicating that the second processor has completed the the task.

7. The method of claim 6, wherein after exiting the loop, the method further comprises executing a portion of the first program thread which requires that the task be previously completed.

8. The method of claim 6, wherein the second processor continues execution of the second program thread after writing the value to the register.

9. The method of claim 6, wherein the first processor has a narrower data path than does the second processor.

10. The method of claim 9, wherein the second processor has a single-instruction-multiple-data architecture.

11. The method of claim 10, wherein the first processor has a general-purpose architecture.

12. The method of claim 6, wherein executing the second instruction further comprises writing the flag from the register to a status register of the first processor before the first processor sets the flag in the register.

13. A method for operating a multiprocessor, the method comprising:

executing a first program thread on a first processor;

starting a second program thread on a second processor in response to a first instruction executed by the first processor;

continuing execution of the first program thread on the first processor while the second processor executes the second program thread;

executing a second instruction in the second program thread that generates an interrupt to the first processor, the interrupt indicating that the second processor has completed a task; and in response to the interrupt, executing an interrupt routine in the first processor, wherein the interrupt routine synchronizes completion of the task with execution of the first programming thread.

14. The method of claim 13, wherein after executing the interrupt routine, the method further comprises executing a portion of the first program thread which requires that the task be previously completed.

15. The method of claim 13, wherein executing the second instruction further comprises halting execution of the second program thread and idling the second processor.

* * * * *